United States Patent [19]

Geurts

[11] 4,296,437
[45] Oct. 20, 1981

[54] CLAMPING CIRCUIT FOR A VIDEO SIGNAL

[75] Inventor: Martinus F. A. M. Geurts, Nijmegen, Netherlands

[73] Assignee: U.S. Philips Corporation, New York, N.Y.

[21] Appl. No.: 113,885

[22] Filed: Jan. 21, 1980

[30] Foreign Application Priority Data

Mar. 5, 1979 [NL] Netherlands .................... 7901722

[51] Int. Cl.³ ............................................. H04N 5/16
[52] U.S. Cl. ................................................. 358/173
[58] Field of Search ............... 358/171, 172, 173, 160; 330/11, 252, 259–261; 307/237, 540, 552, 553

[56] References Cited

U.S. PATENT DOCUMENTS 3,927,255  12/1975  Yorkanis ........................... 358/172
3,955,047   5/1976  Willis ................................. 358/173

FOREIGN PATENT DOCUMENTS 2433452  1/1976  Fed. Rep. of Germany ...... 358/173
2810706  9/1979  Fed. Rep. of Germany ...... 358/173

*Primary Examiner*—Marc E. Bookbinder
*Assistant Examiner*—Michael A. Masinick
*Attorney, Agent, or Firm*—Thomas A. Briody; William J. Streeter; Edward W. Goodman

[57] ABSTRACT

A video clamping circuit comprising a differential amplifier the output of which is connected to the circuit output via a diode and is also fed-back to an amplifier input which is further connected to a reference voltage-carrying terminal via a resistor, the amplifier output being also connected to a capacitor charging circuit for charging a capacitor which is connected to the amplifier input for receiving a video signal. During charging of the capacitor the cut-off diode effects an effective signal separation between the input of the circuit and the output, it being ensured that last-mentioned output carries the constant reference voltage.

5 Claims, 4 Drawing Figures

CLAMPING CIRCUIT FOR A VIDEO SIGNAL

BACKGROUND OF THE INVENTION

The invention relates to a clamping circuit for a video signal, the clamping circuit comprising a differential amplifier the output of which is fed back to an amplifier input via a diode and is also connected to the output of the clamping circuit, an input of the amplifier being connected to a terminal which carries a reference voltage, a further input for receiving a video signal being connected to a capacitor which is connected to a capacitor charging and discharging circuit.

Such a clamping circuit is disclosed in the German Offenlegungsschrift No. 2,433,452, which describes that the feed-back is effected from the circuit output to the amplifier input for receiving the video signal and is connected to the isolating capacitor, the terminal which carries the reference voltage being connected directly to the second amplifier input. It is described that at the occurrence of line synchronizing pulses in the video signal and on the passage of the reference voltage, the amplifier supplies a voltage which renders the diode conductive, in response to which the capacitor, via which the video signal is applied, is charged. The capacitor is thus charged to a voltage at which the level of the line synchronizing pulses in the output signal is fixed or, in other words, clamped onto the reference voltage.

It appears that the isolating capacitor, which is arranged between the input and the output of the clamping circuit, is charged via the diode during the line synchronizing pulses or, in other words: during clamping of the line synchronizing pulse level in the output signal onto the reference voltage the output is capacitively coupled to the input of the clamping circuit to which the video signal is applied.

SUMMARY OF THE INVENTION

It is an object of the invention to provide a clamping circuit wherein, during clamping of the line synchronizing pulse level in the output signal, the output is effectively isolated from the clamping circuit input and clamping of the pulse level onto the reference voltage is fully ensured. A clamping circuit according to the invention is therefore characterized in that a junction point between the clamping circuit output and the diode is fed back to the amplifier input which is connected to a reference voltage-carrying terminal via a resistor, and a junction point between the amplifier output and the diode is connected to the capacitor charging circuit.

With the described construction the diode is blocked during the clamping of the line synchronizing pulse level in the output signal which provides an effective isolation between the output and the input of the clamping circuit in which the amplifier feed-back is interupted. Charging of the capacitor at the input of the amplifier is effectively isolated from the output.

In order to realise a desired gain factor (for example substantially equal to unity) between input and output signal of the clamping circuit, the circuit is characterized in that said junction point between the output of the clamping circuit and the diode is connected to the amplifier input via a resistor.

A clamping circuit comprising a simple capacitor charging circuit is characterized in that the capacitor charging circuit comprises a transistor a control electrode of which is connected to the said junction point between the amplifier output and the diode, the charging circuit being actuable by means of this transistor operating as a switching transistor.

A further construction with a simple drive of the said transistor, is characterized in that the emitter of the said transistor is connected as control electrode to the said junction point and that the base is connected to the terminal which carries a reference voltage.

An embodiment of the clamping circuit comprising a signal limiting circuit is characterized in that the said junction point between the amplifier output and the diode is connected to the first-mentioned diode via a second diode, these diodes having been arranged with opposite current directions, the diode junction point being connected, via a resistor, to a voltage-carrying terminal to form a limiting circuit.

DESCRIPTION OF THE DRAWINGS

The invention will be further explained with reference to the accompanying Figures, which are given by way of example and wherein.

DESCRIPTION OF THE PREFERRED EMBODIMENTS

Figure 1:
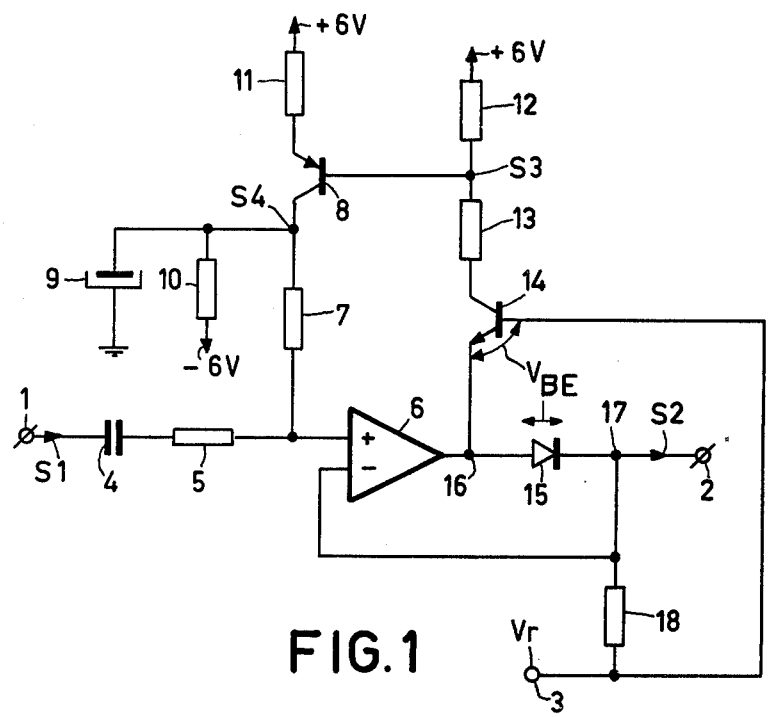
FIG. 1 shows a first embodiment of the clamping circuit according to the invention.
Figure 2:
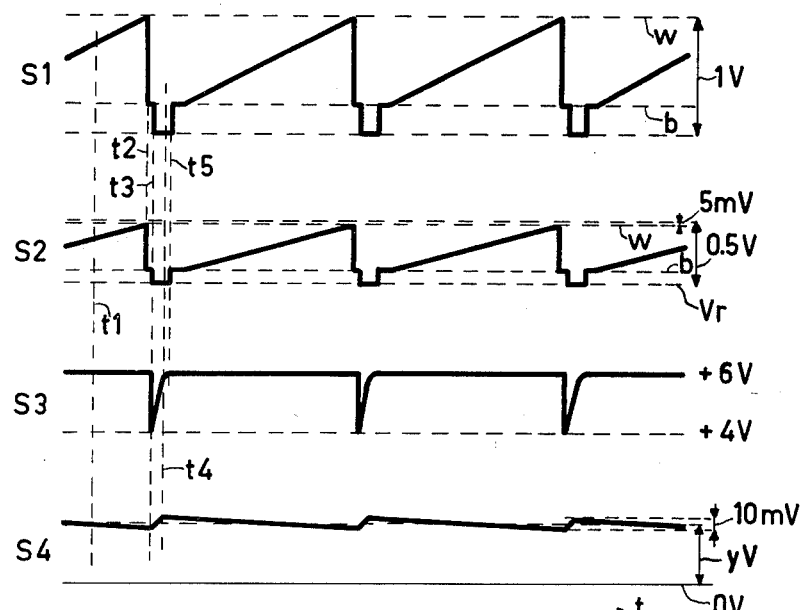
FIG. 2 shows some signal curves as a function of the time to explain the operation of the clamping circuit shown in FIG. 1.

Referring to FIG. 1, an input of the clamping circuit is denoted by 1, an input signal S1, the signal curve of which is shown in FIG. 2 as a function of the time t, being applied to this input 1. Reference numeral 2 denotes an output of the clamping circuit at which an output signal S2 occurs. FIG. 2 shows the signal curve of the signal S2. When the signal S1 is applied with a peak-to-peak value equal to 1 V, the signal S2 has a peak-to-peak value of approximately 0.5 V. The signal S1 is a video signal which in the drawing, has line synchronizing pulses and a video content with a gradual signal increase from a black level b to a peak white value w, whereafter a sudden signal transient to the black level b occurs. The height of the line synchronizing pulses occupies, in a predescribed manner, for example, one-fourth of the peak-to-peak value, FIG. 2 showing, at the same level, the black level b, which however, may be at 30% of the peak-to-peak value. Only the peak-to-peak value is important for the input signal S1, the black level b having an arbitrary value which depends on the signal processing in preceding circuits, not shown. The black level b in the output signal S2 is clamped onto a distinct voltage by means of the clamping circuit of FIG. 1, by fixing or clamping the d.c. voltage level of the line synchronizing pulses in the output signal S2 onto a reference voltage $V_r$ which may, for example, be the ground potential. The reference voltage $V_r$ is present at a terminal 3 of the circuit shown in FIG. 1.

Via a series arrangement of an isolating capacitor 4 and a resistor 5, the input 1 of the clamping circuit is connected to a (+) input of a differential amplifier 6. In addition, the (+) amplifier input is connected, via a resistor 7 to the collector of a pnp transistor 8, which is connected to ground via an electrolytic capacitor 9 and to a terminal which carries a supply voltage of −6 V, via a resistor 10. The emitter of the transistor 8 is connected to a terminal, which carries a +6 V supply voltage, via a resistor 11. The base of the transistor 8 is connected to a junction of the resistors 12 and 13, which are arranged in series between a terminal, which carries a +6 V supply voltage, and the collector of a npn transistor 14. The base of the transistor 14 is connected to the terminal 3, which carries the reference voltage $V_r$. The emitter of the transistor 14 is connected to the output of the amplifier 6, which is further connected to the anode of a diode 15, this junction point being denoted by 16. The cathode of the diode 15 is connected to the output 2 of the clamping circuit, the junction point being indicated by reference numeral 17. The junction point 17 is directly connected to the (−) input of the amplifier 6 and via a resistor 18 to the terminal 3. The clamping circuit shown in FIG. 1 thus comprises a capacitor charging circuit (5, 7, 8, 11, 14), through which the two capacitors 4 and 9 are periodically charged, a capacitor discharging circuit (5, 7, 10) being present, which comprises the sole discharge resistor 10 for the capacitor 9 and the series-arranged discharge resistors 5, 7 and 10 for the capacitor 4.

To explain the operation of the clamping circuit shown in FIG. 1, FIG. 2 shows, in addition, the signal curves for two signals S3 ad S4. The signals S3 and S4, respectively, are present at the base and the collector, respectively, of the transistor 8. An instant t1 is the starting point. At the instant t1 the signal S1 occurs with a value which would have to correspond to a bright grey picture portion on display, which occurs at the display of the signal S2, since the line synchronizing pulses have been fixed or clamped onto the reference voltage $V_r$. As it is assumed that the resistors 5 and 7 are of the same value half of the signal change occurring in the signal S1 is applied to the (+) input, and is present via the fed-back amplifier 6 in the signal S2 applied to the (−) input. The transistors 14 and 8 are cut-off and the signal S4 shows a voltage decrease in response to the discharging of the capacitors 9 and 4.

At an instant t2 the sudden signal transient from the peak-white value w to the black level b occurs in the input signal S1, which sudden signal transient occurs at 50% in the output signal S2. The leading edge of the line synchronizing pulse occurs at an instant t3. At this instant t3 the leading edge of the pulse causes the voltage at the point 16 to decrease in a sudden manner, the voltage jump being passed-on to the junction point 17 via the diode 15. The voltage at the junction point 17 decreases to the reference voltage $V_r$, cutting-off the diode 15. A voltage $V_r + V_{BE}$ is then present at the anode of the diode 15 which is then blocked, $V_{BE}$ being on the one hand the base-emitter threshold voltage of a transistor (for example transistor 14) and, on the other hand, the anode diode voltage drop of a conducting diode (15). While the cutoff diode 15 causes the junction point 17 to remain at the reference voltage $V_r$ present at the terminal 3, the voltage at the junction point 16 decreases still further. The reference voltage $V_r$ is then present at the (−) input of the amplifier 6, which is then no longer in the fed-back condition, when the continuing voltage jump in the leading edge occurs at the instant t3. The transistor 14 becomes conductive at the instant at which the voltage $V_r - V_{BE}$ occurs at the point 16. This results in a voltage jump from +6 V to, for example, +4 V, in response to which also transistor 8 beomes conductive. Current is applied to the capacitors 9 and 4 via the transistor 8 which was turned-on by the switching transistor 14. The resultant voltage increase at the collector of the transistor 8 after the instant t3 is shown in the signal S4 in FIG. 2. In response thereto the voltage at the (+) input of the amplifier 6 increases, which increase results in an increase in the voltage at point 16 via the non-fed back amplifier 6. The transistor 14 will then gradually conduct less current, which produces the signal variation shown in signal S3 after the instant t3. At an instant t4 the voltage at the point 16 reaches the value $V_r - V_{BE}$, in response to which the transistor 14 and also the transistor 8 are cut-off. The diode 15 remains in the non-conductive state, while charging of the capacitors 9 and 4 has stopped.

Thereafter, the trailing edge of the line synchronizing pulse in the signal S1 occurs at an instant t5. The positive-going voltage jump produces a positive-going voltage jump at the point 16 via the amplifier 6, so that, when the value $V_r + V_{BE}$ is exceeded the diode 15 becomes conductive and the feedback condition of amplifier 6 is re-instated. After the instant t5 the fed-back amplifier 6 operates in the manner described for instant t1. FIG. 2 shows for the signal S4, by way of example, a 10 mV voltage jump produced by the capacitor discharge, which corresponds, for the 1 V peak-to-peak value, to a 1% decrease of the signal, resulting in that the peak-white value w of the signal S2 has a voltage value which is 5 mV below the required 0.5 V value. Furthermore, the value yV is shown as the mean value of signal S4 of FIG. 2. The value yV depends on the mean signal value of the video input signal S1, which is determined by the video content and by the d.c. voltage level.

The described construction of the clamping circuit shown in FIG. 1 has the considerable advantage that, since the diode 15 is cut-off between the instants t3 and t5, it is ensured that the output carries then the reference voltage $V_r$, the charging of the capacitors 9 and 4 having no influence whatsoever on the output voltage. Between the instants t3 and t5, the diode 15 effects a very efficient signal separation between the output 2 of the clamping circuit, which carries the constant reference voltage $V_r$, and the charging of the capacitors 9 and 4 at the (+) input of the amplifier 6, which is in the non-fed back condition.

In the circuit shown in FIG. 1 the emitter of transistor 14 is used as the control electrode, the base being connected to a d.c. voltage for which the reference voltage $V_r$ has been chosen. Control by means of the base instead of by means of the emitter might alternatively be possible.

Figure 3:
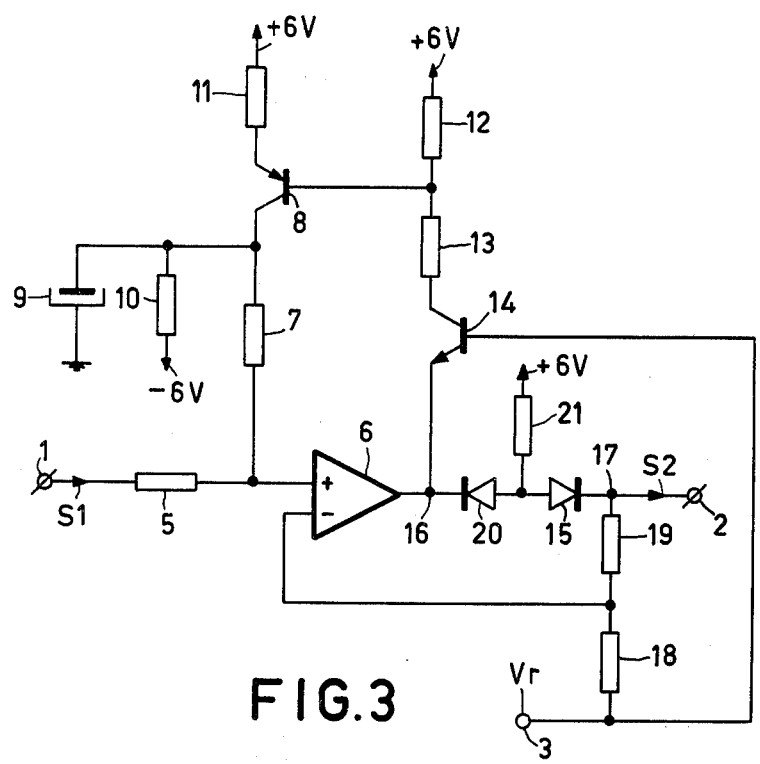
FIG. 3 shows a second embodiment of a clamping circuit according to the invention, provided with a limiting circuit.

In the embodiment of the clamping circuit as shown in FIG. 3 the components already described for the circuit of FIG. 1 are given the same reference numerals. The isolating capacitor 4 has been omitted, it also being possible to omit the capacitor from the circuit shown in FIG. 1, the construction not being changed in other respects. Consequently, there is a capacitor charging circuit formed by the components (8, 11–14) for the sole capacitor 9. An additional resistor 19 is provided between the point 17 and the junction point of the (−) amplifier input and the resistor 18. Assuming the resistors 18 and 19 to have the same value, and also the resistors 5 and 7 to have the (different) same value it follows that the signal S2 has a peak-to-peak value which is substantially equal to the peak-to-peak value (1 V) of the signal S1. The capacitor discharge, which is already described for FIGS. 1 and 2, and which corresponds to 1% of the peak-to-peak value of the signal S1, results in the voltage difference of 10 mV shown in FIG. 4 at the peak-white value w. The resistor 19 might alternatively, be used for an otherwise unchanged construction of the circuit shown in FIG. 1.

The circuit shown in FIG. 3 comprises a diode 20 the cathode of which is connected to the point 16 and the anode to the anode of the diode 15, these diodes being connected to a terminal, which carries a voltage of +6 V, via a resistor 21. The diode 20 and the resistor 21 form a limiting circuit (20, 21) for signal peaks in the input signal S1 which exceed the peak-white value w by, for example, more than 10% of the peak-to-peak value of 1 V.

Figure 4:
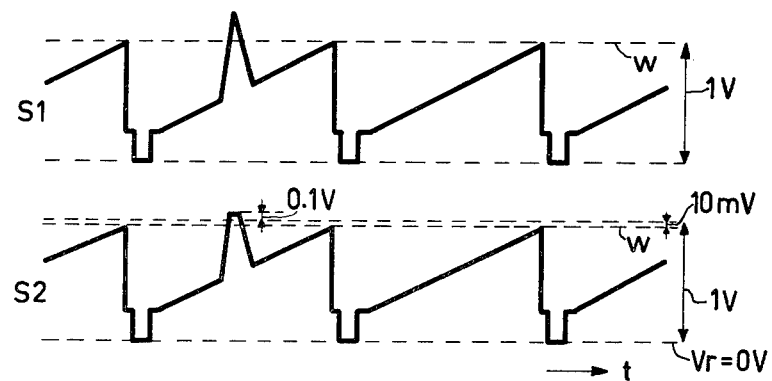
FIG. 4 shows some signal curves as a function of the time to explain the operation of the clamping circuit shown in FIG. 3.

In FIG. 4 the signal S1 is shown with a signal peak which exceeds the peak-white value w. The signal peak in the signal S1 results in such a large positive signal peak in the amplifier signal at the point 16 that the diode 20 is cut-off. The point 17 is included in a voltage divider formed by the resistor 21, the conducting diode 15 and the resistors 19 and 18. The use of a diode 15, carrying a current of 0.55 mA at a voltage drop of 0.7 V, resistors 18 and 19, each having a value of 1000 ohms, and a resistor 21 of 7600 ohms, provided between +6 V and $V_r=0V$, results in a maximum possible voltage of +1.1 V at the output 2.

The limiting circuit (20, 21) operates at signal values which exceed the top white value w and does not affect the clamping, in the signal S2, of the line synchronizing pulse level onto the reference voltage $V_r$. The operation of the clamping circuit on blocking of the diode 15 is the same as the operation described for FIG. 1, the difference being that the point 16 does not carry the voltage $V_r+V_{BE}$ but the voltage $V_r$ at the instant at which the reference voltage $V_r$ at point 17 is reached. In response to the voltage drop at point 16 to $V_r-V_{BE}$ the transistor 14 becomes conductive and the capacitor charging circuit (8, 11–14) for the capacitor 9 is switched-on.

The following values can be chosen to realize a clamping circuit according to the invention:

capacitor 4: 100 μF
resistors 5 and 7: 4700 Ohm
gain factor amplifier 6: 50 to 100
capacitor 9: 10 μF
resistor 10: 47 kOhm
resistor 11: 470 kOhm
resistor 12: 4700 kOhm
resistor 13: 10 kOhm
resistors 18 and 19: 1 kOhm
resistor 21: 7600 Ohm

What is claimed is:

1. A clamping circuit for a video signal comprising an input and an output, a differential amplifier having a first and a second input and an output, a capacitor connected between said clamping circuit input and said differential amplifier first input, a capacitor charging and discharging circuit connected to said capacitor at said differential amplifier first input and to said differential amplifier output, a diode coupled between said differential amplifier output and said output of said clamping circuit, means for coupling said clamping circuit output to said differential amplifier second input, means for supplying a reference voltage, and a resistor for coupling said reference voltage to said differential amplifier second input.

2. A clamping circuit as claimed in claim 1, characterized in that the output of the clamping circuit is connected to the amplifier differential second input via a resistor.

3. A clamping circuit as claimed in claims 1 or 2, characterized in that the capacitor charging and discharging circuit comprises a transistor, a control electrode of which being connected to the differential amplifier output, the charging and discharging circuit being actuable by means of this transistor operating as a switching transistor.

4. A clamping circuit as claimed in claim 3, characterized in that the emitter of the said transistor is connected as control electrode to said differential amplifier output and that the base is connected to the reference voltage means.

5. A clamping circuit as claimed in claim 3, characterized in that an additional diode is coupled between said differential amplifier output and said diode, said diode and said additional diode being arranged in opposing current directions, the diode junction point being connected, via a resistor, to a voltage-carrying terminal to form a limiting circuit.

* * * * *